United States Patent [19]

Gitchel

[11] 4,312,761
[45] Jan. 26, 1982

[54] TREATMENT OF CLAY SLIMES

[75] Inventor: Wayne B. Gitchel, Rothschild, Wis.

[73] Assignee: Zimpro-AEC Ltd., Calgary, Canada

[21] Appl. No.: 208,700

[22] Filed: Nov. 20, 1980

Related U.S. Application Data

[63] Continuation-in-part of Ser. No. 153,887, May 28, 1980, abandoned.

[51] Int. Cl.$^3$ .............................................. C02F 1/72
[52] U.S. Cl. ............................................ 210/747; 210/761; 210/765; 210/907
[58] Field of Search ............. 210/702, 714, 721, 722, 210/728, 729, 747, 758, 759, 761, 762, 765, 774, 907

[56] References Cited

U.S. PATENT DOCUMENTS

| | | | |
|---|---|---|---|
| 2,824,058 | 2/1958 | Zimmermann | 210/761 |
| 3,359,200 | 12/1967 | Gitchel et al. | 210/761 |
| 3,803,032 | 4/1974 | Adachi | 210/714 |
| 3,876,497 | 4/1975 | Hoffman | 210/761 |
| 4,017,392 | 4/1977 | Hamer | 210/907 |
| 4,051,027 | 9/1977 | Batzer | 210/702 |
| 4,069,152 | 1/1978 | Specken | 210/728 |
| 4,100,730 | 7/1978 | Pradt | 210/761 |
| 4,141,829 | 2/1979 | Thiel | 210/762 |
| 4,174,280 | 11/1979 | Pradt | 210/761 |
| 4,211,174 | 7/1980 | Martin | 210/761 |

FOREIGN PATENT DOCUMENTS 54-101783 8/1979 Japan .................................. 210/761

OTHER PUBLICATIONS

Frederick W. Camp, "Processing Athabasca Tar Sands—Tailings Disposal", The Canadian Journal of Chemical Engineering, vol. 55, Oct. 1977, pp. 581–591.
M. A. Kessick, "Clay Slimes from the Extraction of Alberta Oil Sands, Florida Phosphate Matrix and Other Mined Deposits", Canadian Mining and Metallurgical Bulletin, Feb. 1978.
Z. G. Havlena, First International Conference on the Future of Heavy Crude and Tar Sands, Edmonton, Alberta, Jun. 7, 1979.

*Primary Examiner*—Ernest G. Therkorn
*Attorney, Agent, or Firm*—Allen H. Erickson; Thomas L. Johnson; B. Woodrow Wyatt

[57] ABSTRACT

A process for dewatering slimes produced in mining and mineral processing operations whereby wet oxidation at 150°–320° C. renders the solids rapidly settleable. Sufficient oxygen is supplied to meet or exceed oxygen demand. Inorganic solids in the oxidized product are separated and optionally further dewatered to a friable solid. Clarified water is recycled to the mining, mineral processing or other operations, or treated further, or discharged to the environment. Steam resulting from the wet oxidation is utilized in the mining or mineral processing operations.

9 Claims, 2 Drawing Figures

TREATMENT OF CLAY SLIMES

This application is a continuation-in-part of copending application Ser. No. 153,887, filed May 28, 1980, now abandoned.

BACKGROUND OF THE INVENTION

There are a number of mining operations worldwide that produce minerals by the processing of clay and sand bearing ores. Examples of such operations are oil sands extraction, phosphate rock mining, china clay mining, diamond mining and bauxite refining.

Waste products from such processes are inorganic materials such as sand and clays and process waters contaminated with suspended organic and inorganic matter. The process waters often contain dissolved organic and inorganic matter as well. The simplest method of disposal of such byproducts would be to return them to mined-out areas. This disposition is acceptable for rapidly settling, coarse, compactable components such as sand. Generally the mined-out areas will accommodate only the settled sand. However, the clays are generally of the swelling variety and form slimes at 5-10 percent solids concentration along with dispersed organic matter. These slimes increase the volume of total wastes to be disposed of by 30 to 40 percent.

A common practice has been to impound the slimes in ponds formed by building dikes with the sand fractions. With settling times of weeks, months or years the solids content at mid-depth of ponds may reach 20-30 percent and the surface layer may reach sufficient clarity to be recycled. It is possible to reach a steady state at which the recycled water volume suffices for mining or other operations and the pond area does not expand. However, in such practice the ponds require enormous areas. Furthermore, organic matter which accumulates on the pond surfaces creates an environmentally unacceptable situation.

The clay slimes problem as related to heavy oil (bitumen) recovery from tar sands has been described by many; for example, Frederick W. Camp, "Processing Athabasca Tar Sands—Tailings Disposal", The Canadian Journal of Chemical Engineering, Vol. 55, October, 1977, pages 581-591. A general review is given by M. A. Kessick, "Clay Slimes from the Extraction of Alberta Oil Sands, Florida Phosphate Matrix and Other Mined Deposits", Canadian Mining and Metallurgical Bulletin, February 1978.

The critical need is to find means to reduce tailings volume, greatly increase the fine particle settling rate to provide more efficient water recycle, and eliminate insoluble and soluble organic matter from ponded water. The review lists many methods which have been studied; none has satisfactorily met the needs. Included in these methods are addition of flocculating agents, pH reduction, bacterial treatments, ultrasonics, agglomeration, electrophoretic methods, freeze-thawing and co-filtration with fly ash.

Slimes resulting from mining and processing of clay and sand bearing ores are typically very difficult to consolidate and dewater. This invention is a method for treating such slimes whereby the land area required for final disposal is greatly reduced and water removed from the slime may be re-used in the mining or processing operations.

The wet oxidation procedure, used in the process of the instant invention, is a well developed, commercially used technique and is described, for example, in Pradt U.S. Pat. No. 4,100,730 (Jul. 18, 1978), Gitchel et al. U.S. Pat. No. 3,359,200 (Dec. 19, 1967), Zimmermann U.S. Pat. No. 2,824,058 (Feb. 18, 1958) and Hoffman U.S. Pat. No. 3,876,497 (Apr. 8, 1975). Although the process has been used in many different ways there is no reference in published literature to application in treating clay slimes or any medium of "swelling type".

PRIOR PUBLICATION

Certain aspects of this invention have been described in a manuscript of a paper presented at the First International Conference on the Future of Heavy Crude and Tar Sands, in Edmonton, Alberta on June 7, 1979, author Z. G. Havlena. This publication was made subsequent to the time the invention disclosed and claimed herein was made, and the pertinent disclosure of said publication was derived from the inventors of the instant invention.

SUMMARY OF THE INVENTION

In this invention, clay slime is wet oxidized in the presence of an oxygen containing gas at a temperature of 150° to 320° C. and at a pressure of 500 to 3200 psig, where the oxygen supplied meets or exceeds the oxygen demand of the slime, and wherein at least a portion of the water in the slime is evaporated. After wet oxidation, the remaining finely divided inorganic matter is separated, leaving a clarified water phase which is either discharged to the environment, with or without further treatment, or recycled to an industrial operation requiring water of high quality such as a mining or mineral processing operation. The settled inorganic matter may be further dewatered to a friable solid for final disposal.

DESCRIPTION OF THE PREFERRED EMBODIMENT

This invention relates to the treatment of various waste products from the mining and processing of oil sands, phosphate rock, china clay, diamond, bauxite and other materials. Common to these wastes is the formation of slime in water. These slimes consist of very finely divided inorganic material and accompanying organic matter, suspended in water. Soluble matter is also often present. Regardless of the source, they will hereinafter be referred to as clay slimes, or simply as slimes.

We have found that the application of wet oxidation to slime disposal has several advantageous features. First of all, wet oxidation does eliminate organic matter and is the only practical way to accomplish this for a relatively dilute wastewater. Further, wet oxidation has been found to provide clean clay suspension from which particles settle at very high rates. Still further, we have found these concentrated clay suspensions, after settling to filter with ease, thus providing means of further volume reduction. Additionally, wet oxidation can be conducted with a high degree of evaporation, providing still another way of reducing solids volume and making water available for recycle.

Wet oxidation consists of contacting an aqueous solution or suspension of oxidizable matter with an oxygen containing gas under conditions promoting efficient mixing of gas and liquid phases at elevated temperatures and pressures. Temperatures are typically 150°14 320° C. and pressures of 500–3200 psig. The oxygen may be supplied as pure molecular oxygen, in air or in mixture with other gases such as carbon dioxide. Oxidation of reactive substances occurs in the liquid phase and heat of reaction equivalent to heats of combustion are transferred directly to the reacting mixture.

Figure 1:
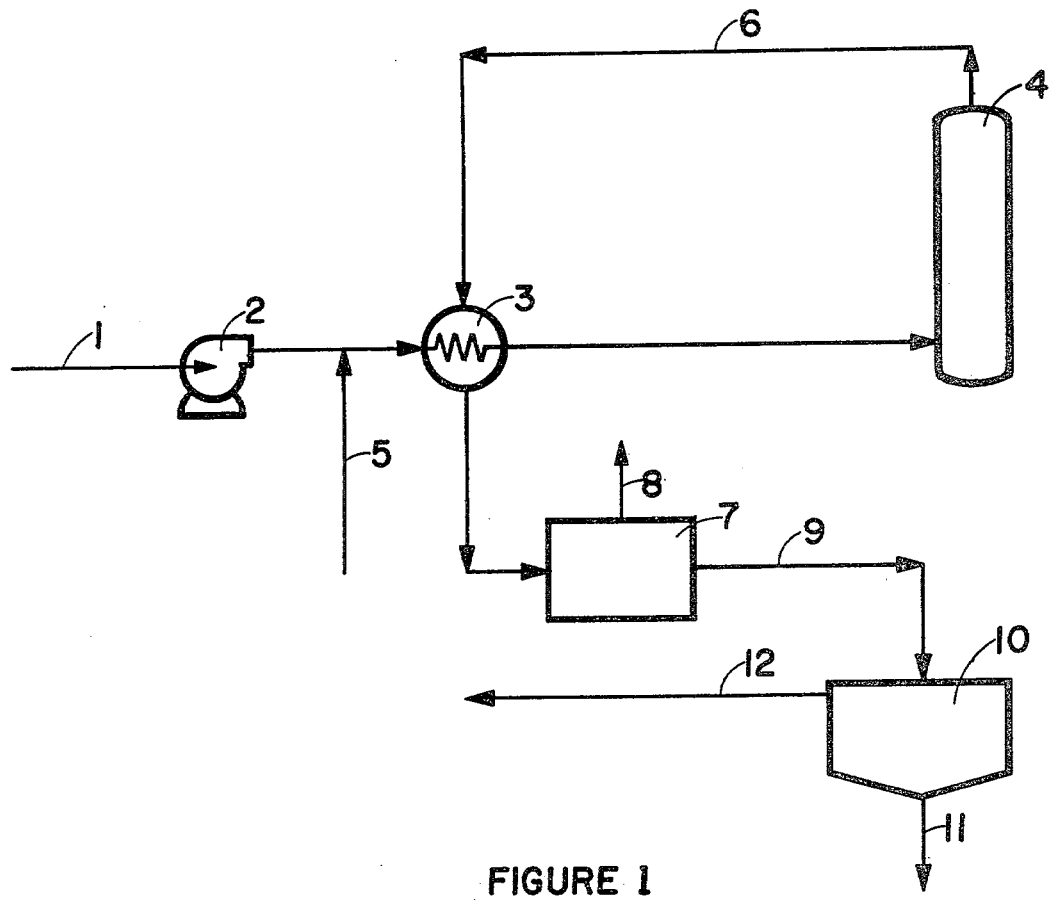
FIG. 1 is a schematic diagram of the invention in which relatively little evaporation of water is accomplished.
Figure 2:
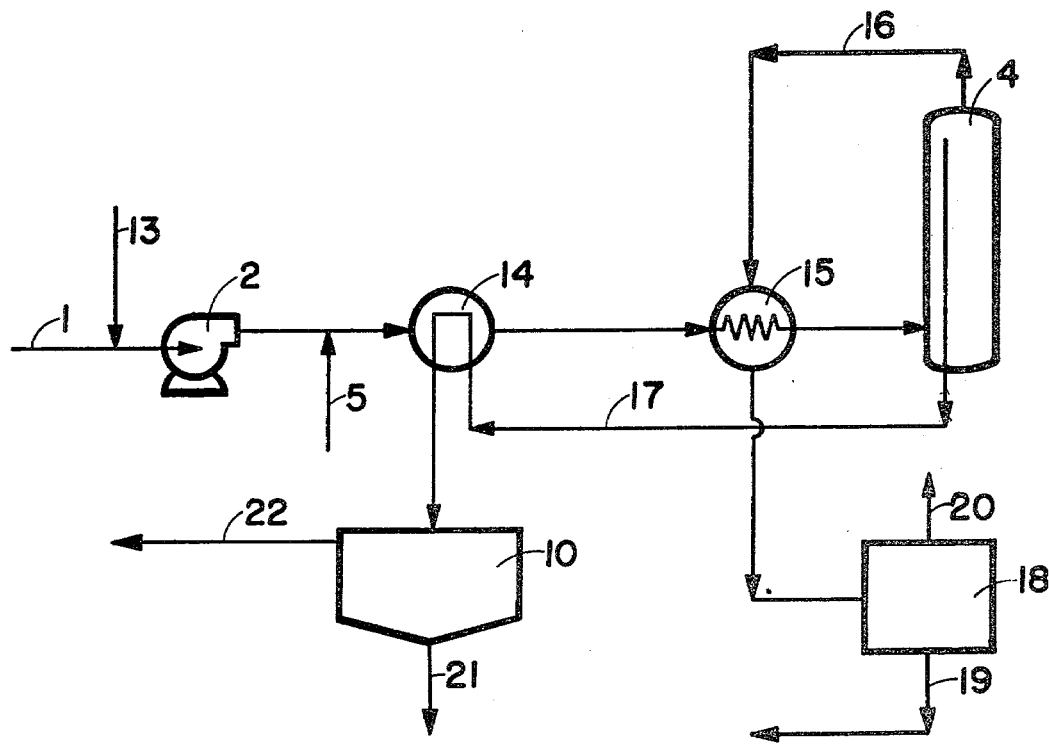
FIG. 2 shows the invention as used with slimes having relatively high oxygen demand and when a relatively high degree of evaporation is accomplished.

In experimental studies wet oxidation may be conducted in shaking, rocking or mechanically stirred batch autoclaves. For commercial application continuous flow equipment is used. The essential components of such a unit are a feed pump, a source of compressed oxygen containing gas, heat exchangers and a reactor so designed as to create effective phase mixing from turbulent flow. FIGS. 1 and 2 show two of many possible arrangements.

The arrangement according to FIG. 1 is employed when little evaporation of water is desired and when the concentration of oxidizable material, e.g. the oxygen demand in the slime, is relatively low. Typically, this embodiment is useful when the oxygen demand is less than about 20–50 g/l.

In FIG. 1, slime 1 is transferred by pump 2 through heat exchanger 3, whereby it is heated, and into reactor 4. Compressed air or other oxygen containing gas 5 is introduced into the stream of slime prior to its passage through the heat exchanger, or alternatively, after the heat exchanger or directly into the reactor. Following wet oxidation in reactor 4, the oxidized slurry 6 comprised primarily of inorganic solids in water, together with reaction gases, is cooled by indirect heat exchange with the incoming stream of slime in heat exchanger 3 and enters phase separator 7. Vent gases 8 containing water vapor are discharged, and the inorganic solids in the unconcentrated oxidized product 9 are thickened or dewatered in device 10, which may be a gravity settler-clarifier, pond, filter, centrifuge or the like or combinations thereof. Concentrated inorganic solids 11 are discharged to final disposal and the clarified water phase 12 is recycled to the mining, mineral processing or other operation, or treated further, or discharged to the environment.

The embodiment of the invention illustrated in FIG. 2 is useful when a large fraction, typically greater than 50 percent, of the water is evaporated. Thus large quantities of useful steam are generated. An upper limit of evaporation is determined by the flow properties of the particular oxidized slurry. At solids concentrations greater than 25–50 percent solids, plugging of the reactor outlet and piping may occur. Slime 1 is transferred by pump 2 through heat exchangers 14 and 15 to reactor 4. Compressed air or other oxygen containing gas 5 is usually introduced into the stream of slime before passage through heat exchanger 14. Alternatively, the gas may be added to the slime after heat exchanger 14, following heat exchanger 15, or directly to the reactor.

Following wet oxidation in reactor 4, fixed gases and water vapor 16 are separated from the liquid phase and cooled by indirect heat exchange with incoming slime in heat exchanger 15. Condensate resulting from cooling is separated from remaining gases and water vapor in separator 18 and recycled to the mining or processing operation via line 19. Thermal energy can be recovered from the stream 20 of water vapor and gases, to provide a portion of all of the low pressure steam requirements of the mining or mineral processing operation.

Evaporation in the reactor of a considerable portion of the slime-associated water results in a concentrated oxidized slurry 17 of primarily inorganic solids which is cooled by indirect heat exchange in heat exchanger 14, wherein the incoming slime 1 is pre-heated. This cooled slurry is passed to a device 10 for thickening and/or dewatering the inorganic solids, wherein a dewatered solids stream 21 is discharged to final disposal, and a clarified water phase 22 is recycled to the mining, mineral processing or other operation. Alternatively, clarified water phase 22 may be treated further or discharged to the environment. The thickening device may be a pond in which solids are finally disposed. The arrangement according to FIG. 2 finds use when a high degree of evaporation is wanted. Those skilled in the art will appreciate that evaporation is a function of temperature, pressure, oxygen demand and the ratio of water to fixed gases. By appropriate selection of values for these variables any desired evaporation can be obtained.

Clay slimes may in some cases have insufficient oxygen demand to sustain a high evaporation wet oxidation. A supplemental fuel 13 must then be added. We have found that waste fuels such as heavy oil emulsions, coal fines or cokes serve well. In the case of tar sands processing the bitumen is usually converted to lighter oils by coking. The byproduct coke is of little utility for ordinary combustion due to the high sulfur content. We have found such coke to be an ideal supplementary fuel for wet oxidation. The high sulfur content is desirable since wet oxidation results in sulfuric acid formation from this sulfur and the resulting lower pH is quite favorable for clay settling and dewatering.

The following examples illustrate several of the wet oxidation methods effective for clay slimes.

EXAMPLE 1

A sample of froth centrifuge tailing produced in a tar sands extraction process contained about 8 ml naphtha per liter of slurry. The solids comprised of fine sand, clay and bitumen formed a stable suspension which exhibited imperceptible settling. The naphtha was readily removed by steam stripping but the solids remained stably suspended. Samples of the naphtha free slurries were oxidized in shaking autoclaves at 250°, 280° and 300° C. with sufficient compressed air charged to provide an excess of oxygen. Results are shown in Table 1.

TABLE 1

|  |  | Wet Oxidized at | | |
|---|---|---|---|---|
|  | Unoxidized | 250° C. | 280° C. | 300° C. |
| Percent of Oxygen Demand Used | — | 65.5 | 75.5 | 82.1 |
| Total Solids, g/l | 80.2 | 71.7 | 69.1 | 68.7 |
| Percent Organic in Insoluble Solids | 20.3 | 6.8 | 6.4 | 5.2 |
| pH | 8.7 | 2.6 | 2.5 | 2.3 |

The rate of solids settling is shown in Table 2.

TABLE 2

| Time, Hrs. | Sludge Volume, percent of Total | | | |
|---|---|---|---|---|
| | Unoxidized | Oxidized at 250° C. | Oxidized at 280° C. | Oxidized at 300° C. |
| 0 | 100 | 100 | 100 | 100 |
| 0.25 | 100 | 71 | 74 | 77 |
| 0.50 | 100 | 56 | 52 | 53 |
| 0.75 | 100 | 51 | 46 | 47 |
| 1.0 | 100 | — | — | — |
| 1.5 | 100 | 46 | 39 | 40 |
| 2.0 | 100 | 43 | 37 | 37 |
| 2.5 | 100 | 41 | 34 | 35 |
| 3.0 | 100 | 40 | 33 | 34 |
| 3.5 | 100 | 39 | 32 | 33 |
| 4.0 | 100 | 38 | 32 | 32 |
| 4.5 | 100 | 37 | 31 | 31 |

EXAMPLE 2

This example illustrates how the wet oxidation of clay+bitumen muds can result in filterable slurries which may be readily dewatered to reduce volume and give drier clays.

A sample of sludge was taken from the 25 foot depth of a tar sands process tailings pond. The clay and bitumen mud had reached a concentration of 29.6 percent solids after months of settling. Samples of mud were diluted 1:1 with water and oxidized at 300° C. in a shaking autoclave in the presence of sufficient air to provide an excess of oxygen. An oxygen demand reduction of 82.7 percent resulted. The oxidized slurries were centrifuged and the liquid phase used to dilute further portions of mud for wet oxidation, illustrating the recycle of water. Oxidized slurries were filtered through 0.45μ membranes under 35 psig pressure. A specific filtration resistance of $34 \times 10^{10}$ cm/g was observed, as measured by the procedure of P. Coackley and B. R. S. Jones, Vacuum Sludge Filtration I. Interpretation of Results of the Concept of Specific Resistance, Sewage and Industrial Waste 28, 8, 963–976 (August 1956). Filter cakes of 50 percent solids resulted. The theoretical filter yield rate for a rotary vacuum filter was calculated to be 3 pounds/hour-square foot, using the method of B. R. S. Jones, Vacuum Sludge Filtration II. Prediction of Filter Performance, Sewage and Industrial Waste 28, 9, 1103–1105 (September 1956).

The specific filtration resistance (SFR) of the unoxidized sample of clay and bitumen mud was $1997 \times 10^{10}$ cm/g, indicating nonfilterability.

EXAMPLE 3

A froth centrifuge tailing sludge of 7.8 percent solids was mixed with a coke from bitumen pyrolysis at a ratio of 1.525 parts coke:1 part tailings solids. Wet oxidations were performed in autoclaves at 250° C. and 280° C. in the presence of sufficient air to provide excess oxygen. Oxygen demand reductions of 70.3 percent and 83.0 percent were obtained. The oxidized slurries were distilled to remove water in an amount equal to that easily removed in a continuous flow plant operating on feed with high feed value. Filtration tests were performed on both of the oxidized slurries and an unoxidized mixture, as well as on an unoxidized slurry of tailing sludge only. Table 3 provides the comparison:

TABLE 3

| Wet Oxidation Temperature, °C. | 250 | 280 | Unoxidized | |
|---|---|---|---|---|
| Water, g | 869.8 | 848 | 927 | 927 |
| Tailing Solids, g | 62.2 | 61.0 | 63.0 | 60.0 |
| Coke Solids, g | 91.3 | 93.1 | — | 102.0 |
| Oxygen Demand, g | 199.8 | 202.9 | — | — |
| Oxygen Demand Reduction, percent | 70.3 | 83.0 | — | — |
| Water Evaporated, percent | 76.4 | 80.6 | — | — |
| SFR of Concentrate cm/g $\times 10^{10}$ | 15.9 | 10.3 | 976 | 2392 |
| Theoretical Filter Rate, lbs./hr./ft$^2$ | 13 | 11 | 0.3 | 0.3 |

These are just a very few examples of how wet oxidation may be applied in many modes to make the containment of aqueous clay wastes economically and environmentally acceptable. Those skilled in the art will readily perceive many other combinations.

We claim:

1. A method for dewatering slimes produced in mining and mineral processing operations, said slimes characterized as stably dispersed slurries of inorganic and organic matter in water wherein a portion of said matter may be soluble, comprising the steps of:
    (a) wet oxidizing the slime in the presence of an oxygen containing gas at a temperature of 150° to 320° C. and a pressure of 500 to 3200 psig, where the oxygen supplied meets or exceeds the oxygen demand of said slime, and wherein at least a portion of the water in the slime is evaporated;
    (b) separating the finely-divided inorganic matter from the wet oxidized slime, obtaining a clarified water phase; and
    (c) removing said separated inorganic matter for disposal or further dewatering followed by disposal.

2. The method according to claim 1, in which further dewatering of separated inorganic matter is comprised of a filtration step.

3. The method according to claim 1, in which more than 50 percent of the water in the slime is evaporated.

4. The method according to claim 3, in which further dewatering of separated inorganic matter comprises a filtration step.

5. The method according to claim 4, further comprising the step of adding auxiliary fuel to the slime before it is wet oxidized.

6. The method according to claim 5, in which said fuel is coke.

7. The method according to claim 1, in which the slime is a concentrated slurry taken from a tailing pond.

8. The method according to claim 1, wherein the clarified water phase is recycled to an industrial operation requiring water of high quality.

9. The method according to claim 8, wherein the industrial operation is a mining or mineral processing operation.

* * * * *

UNITED STATES PATENT AND TRADEMARK OFFICE
CERTIFICATE OF CORRECTION

PATENT NO. : 4,312,761
DATED : January 26, 1982
INVENTOR(S) : Richard K. Kerr et al It is certified that error appears in the above—identified patent and that said Letters Patent is hereby corrected as shown below:

Cover page, [75] Inventor, "Wayne B. Gitchel, Rothschild, Wis" should read -- Richard K. Kerr, Calgary, Alberta, Canada and Wayne B. Gitchel, Rothschild, Wis.--.

Column 3, line 8, "$150°$ $14320°$" should read -- $150-320°$ --.

Signed and Sealed this

Eighteenth Day of May 1982

[SEAL]

Attest:

Attesting Officer

GERALD J. MOSSINGHOFF
Commissioner of Patents and Trademarks